(12) United States Patent
Shinohara et al.

(10) Patent No.: US 10,534,993 B2
(45) Date of Patent: Jan. 14, 2020

(54) CAP SEAL

(71) Applicant: TOPPAN PRINTING CO., LTD., Tokyo (JP)

(72) Inventors: Kenji Shinohara, Tokyo (JP); Takamitsu Nakabayashi, Tokyo (JP); Keinosuke Yamaoka, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/376,520

(22) Filed: Apr. 5, 2019

(65) Prior Publication Data

US 2019/0236429 A1 Aug. 1, 2019

Related U.S. Application Data

(63) Continuation of application No. PCT/JP2017/044744, filed on Dec. 13, 2017.

(30) Foreign Application Priority Data

Dec. 15, 2016 (JP) .................................. 2016-243729

(51) Int. Cl.
*G06K 19/06* (2006.01)
*G06K 19/077* (2006.01)
(Continued)

(52) U.S. Cl.
CPC ....... *G06K 19/07758* (2013.01); *B65D 25/20* (2013.01); *B65D 41/62* (2013.01);
(Continued)

(58) Field of Classification Search
CPC ............ G06K 19/07749; G07F 7/1008; G06Q 20/341
(Continued)

(56) References Cited

U.S. PATENT DOCUMENTS

| 5,126,749 A | 6/1992 | Kaltner |
| 9,016,588 B2 | 4/2015 | Kaga |

(Continued)

FOREIGN PATENT DOCUMENTS

| CN | 101001792 A | 7/2007 |
| CN | 101128841 A | 2/2008 |

(Continued)

OTHER PUBLICATIONS

International Searching Authority, "International Search Report," issued in connection with International Patent Application No. PCT/JP2017/044744, dated Mar. 20, 2018.

(Continued)

*Primary Examiner* — Ahshik Kim
(74) *Attorney, Agent, or Firm* — Foley & Lardner LLP

(57) ABSTRACT

A cap seal includes a cylindrical member covering a side face of the container, and a top face including an IC tag and connected to a first end that is one of two axial ends of the cylindrical member to close the cylindrical member at the first end. The cylindrical member includes a metal portion disposed on the side face of the container, and at least one insulating portion extending from the first end. The cylindrical member forms a closed annular shape in a circumferential direction of the cylindrical member, and the metal portion and the insulating portion are joined to each other.

16 Claims, 2 Drawing Sheets

(51) Int. Cl.
  *G09F 3/03* (2006.01)
  *B65D 51/24* (2006.01)
  *B65D 41/62* (2006.01)
  *B65D 25/20* (2006.01)

(52) U.S. Cl.
  CPC .......... *B65D 51/24* (2013.01); *B65D 51/245* (2013.01); *G09F 3/03* (2013.01)

(58) Field of Classification Search
  USPC ........................................................ 235/492
  See application file for complete search history.

(56) References Cited

U.S. PATENT DOCUMENTS

| | | | |
|---|---|---|---|
| 9,471,817 | B1 | 10/2016 | Alhazme |
| 9,495,851 | B1 | 11/2016 | Russell et al. |
| 9,715,606 | B2 | 7/2017 | Russell et al. |
| 2005/0012616 | A1 | 1/2005 | Forster et al. |
| 2005/0242957 | A1 | 11/2005 | Lindsay et al. |
| 2006/0145870 | A1 | 7/2006 | Coveley et al. |
| 2006/0152364 | A1 | 7/2006 | Walton |
| 2006/0214789 | A1 | 9/2006 | Posamentier et al. |
| 2007/0069895 | A1 | 3/2007 | Koh |
| 2007/0182564 | A1 | 8/2007 | Abbott |
| 2007/0210173 | A1 | 9/2007 | Nagel |
| 2008/0061153 | A1 | 3/2008 | Hickle et al. |
| 2009/0102664 | A1 | 4/2009 | Puccini |
| 2010/0308965 | A1 | 12/2010 | Weitzhandler et al. |
| 2015/0266634 | A1* | 9/2015 | Yang .................. B65D 51/2892 206/221 |
| 2015/0353234 | A1 | 12/2015 | Yagishita et al. |
| 2016/0023812 | A1* | 1/2016 | Kikel .................... B65D 41/02 235/492 |
| 2016/0159535 | A1 | 6/2016 | Diaz et al. |
| 2016/0347513 | A1* | 12/2016 | Coelho Ferreira .... B65D 41/58 |
| 2017/0107120 | A1* | 4/2017 | Sajid ...................... C02F 1/005 |
| 2017/0183135 | A1 | 6/2017 | Pic et al. |
| 2017/0193347 | A1 | 7/2017 | Enguent et al. |
| 2017/0195120 | A1 | 7/2017 | Enguent et al. |
| 2017/0203895 | A1 | 7/2017 | Pic et al. |
| 2018/0197060 | A1 | 7/2018 | Yamaoka et al. |

FOREIGN PATENT DOCUMENTS

| | | |
|---|---|---|
| CN | 202529311 U | 11/2012 |
| CN | 203673507 U | 6/2014 |
| CN | 104411597 A | 3/2015 |
| DE | 1294251 B | 4/1969 |
| DE | 10012204 A1 | 9/2001 |
| FR | 2 848 990 A1 | 6/2004 |
| FR | 3021439 A1 | 11/2015 |
| JP | 3105286 U | 10/2004 |
| JP | 2006-123917 A | 5/2006 |
| JP | 2006-184082 A | 7/2006 |
| JP | 2007-102348 A | 4/2007 |
| JP | 2008-143589 A | 6/2008 |
| JP | 2014-012560 A | 1/2014 |
| JP | 2014-114070 A | 6/2014 |
| WO | WO-2004/032044 A1 | 4/2004 |
| WO | WO-2006/016559 A1 | 2/2006 |
| WO | WO-2015/177448 A1 | 11/2015 |

OTHER PUBLICATIONS

International Searching Authority, "Written Opinion," issued in connection with International Patent Application No. PCT/JP2017/044744, dated Mar. 20, 2018.

European Patent Office, "Communication with extended European Search Report," issued in connection with European Patent Application No. 16 843 663.2, dated Mar. 29, 2019.

European Patent Office, "Communication with extended European Search Report," issued in connection with European Patent Application No. 16 843 663.4, dated Feb. 25, 2019.

International Searching Report, "International Search Report," issued in connection with International Patent Application No. PCT/CN2016/098406, dated Nov. 28, 2016.

International Searching Authority, "Written Opinion," issued in connection with International Patent Application No. PCT/CN2016/098406, dated Nov. 28, 2016.

International Searching Authority, "International Search Report," issued in connection with International Patent Application No. PCT/CN2016/098404, dated Dec. 7, 2016.

International Searching Authority, "Written Opinion," issued in connection with International Patent Application No. PCT/CN2016/098404, dated Dec. 7, 2016.

European Patent Office, "Communication with extended European Search Report," issued in connection with European Patent Application No. 17880921.6, dated Nov. 22, 2019.

* cited by examiner

CAP SEAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/044744, filed on Dec. 13, 2017, which is based upon and claims the benefit of priority to Japanese Patent Application No. 2016-243729, filed on Dec. 15, 2016; the disclosures of which are all incorporated herein by reference in their entireties.

TECHNICAL FIELD

The present invention relates to a cap seal provided with an IC tag.

BACKGROUND ART

Cap seals are materials structured to cover an unsealing part of a container, such as a bottle, and the vicinity of the unsealing part. Such an unsealing part specifically includes an opening at an end or other location of the container, and a cover or a stopper closing the opening. Cap seals are formed, for example, of a shrink film that shrinks when heated. Such a cap seal protects the peripheral portion of the opening from impact, prevents entry of external air into the container, or indicates that the container is not yet opened. Recently, there has been proposed a cap seal provided with an IC tag to manage or authenticate the commodity product which is constituted of a container and the contents. Commodity products provided with such cap seals are managed or authenticated through reading of information recorded on the IC tags using contactless communication (e.g., see PTL 1).

CITATION LIST

Patent Literature

[PTL 1] JP 2006-123917 A

SUMMARY OF THE INVENTION

Technical Problem

A cap seal provided with an IC tab includes, for example, a cylindrical member covering a side face of the container near the unsealing part, and a top face connected to an end of the cylindrical member and covering the cap or the top of the stopper. In the cap seal, the IC tag is provided to the top face. A cylindrical member made of a shrink film is formed by shaping the shrink film into a cylindrical form so as to have an inner diameter larger than that of the outer diameter of the unsealing part. When the cylindrical member formed in this manner is mounted to the container, the unsealing part of the container is inserted into or onto the cylindrical member, and then the cylindrical member is heated so that the film shrinks and forms a cap seal adhering to the container.

In the process of adhering the cap seal to the container by heating, the contents of the container may also be unduly heated. Therefore, if the contents, such as wine, have the property of being easily altered by heat, it is preferable to use a cylindrical member made of only a metal. In this case, the metal cylindrical member is pressed against and adhered to the container to form a cap seal. Such a cylindrical member made of metal can be regarded as forming a closed circular conductor path, i.e., one turn of coil, creating a configuration in which a coil is present near an IC tag. Consequently, induced current passing through this coil may induce change in electromagnetic fields, and this change may deteriorate communication characteristics of the IC tag.

The present invention aims to provide a cap seal capable of reducing or preventing deterioration in communication characteristics of an IC tag.

Improvement of or Solution to Problem

A cap seal for improving or solving the issue set forth above is mounted to an unsealing part of a container and to a neck thereof extending from the unsealing part. The cap seal includes a cylindrical member covering a side face of the container; and a top face including an IC tag and connected to a first end that is one of two axial ends of the cylindrical member to close the cylindrical member at the first end. In the cap seal, the cylindrical member includes a metal portion disposed on the side face of the container, and at least one insulating portion extending from the first end, the cylindrical member forming a closed annular shape in a circumferential direction of the cylindrical member, and the metal portion and the insulating portion are joined to each other.

According to the above configuration, conduction in the circumferential direction of the cylindrical member is interrupted by the insulating portion. Thus, inductance in the cylindrical member is reduced compared to the configuration in which a closed circular conductor path is formed throughout the cylindrical member. Thus, the cylindrical member is less likely to affect electromagnetic fields during contactless communication between the IC tag and an external device. Thus, communication characteristics, such as communication range of the IC tag, are prevented from being deteriorated.

In the above configuration, the insulating portion may have a length that is two thirds or more the length of the cylindrical member in a direction in which the cylindrical member extends.

According to the above configuration, deterioration in communication characteristics of the IC tag is favorably minimized and good communication is established between the IC tag and the external device.

In the above configuration, the metal portion may include two ends arranged in a radial direction of the cylindrical member; and at least one of the at least one insulating portion may include a portion sandwiched between the two ends of the metal portion.

The above configuration can favorably achieve a structure in which circumferential conduction in the cylindrical member is interrupted by the insulating portion, and can increase the strength of the cylindrical member due to overlap of the ends of the metal portion.

In the above configuration, the metal portion may include two ends arranged in a circumferential direction of the cylindrical member; and at least one of the at least one insulating portion may include a portion located being sandwiched between the two ends of the metal portion, as seen from the outside of the cylindrical member.

The above configuration can favorably achieve a structure in which conduction in the circumferential direction of the cylindrical member is interrupted by the insulating portion.

In the above configuration, the two ends of the metal portion may be both ends of a single metal portion in the circumferential direction; and the insulating portion having a portion sandwiched between the two ends may be an adhesive insulating portion made of an insulating adhesive, with the both ends of the metal portion being adhered thereto.

According to the above configuration, the configuration for cylindrically forming a cylindrical member can simultaneously be a configuration for forming an insulating portion. Thus, a cylindrical member including an insulating portion can be achieved with a simple configuration.

In the above configuration, the adhesive insulating portion may include a portion sandwiched between the two ends arranged in the radial direction of the cylindrical member; and the portion sandwiched between the two ends in the adhesive insulating portion may have a capacitance of 3,000 pF or less.

According to the above configuration, good communication can be established between the IC tag and the external device at a communication frequency of 13.56 MHz, for example.

In the above configuration, the cylindrical member may have a multilayer structure including a plurality of layers arranged in a radial direction of the cylindrical member; the plurality of layers may include a resin layer and a metal layer, the resin layer having insulating properties, the metal layer being located radially outward of the resin layer to configure the metal portion, the metal layer having two ends adjoining each other on the resin layer via a clearance extending from the first end; and the resin layer may include an interstitial insulating portion joined to the two ends of the metal layer to configure the insulating portion.

According to the above configuration, the position, the size and the shape of the insulating portion can be adjusted by the settings of the position, the size and the shape of the clearance S. Thus, the position, the size and the shape of the insulating portion are easily adjusted and the degree of freedom in adjustment is enhanced.

In the above configuration, the resin layer may have a plurality of interstitial insulating portions.

According to the above configuration, the conductor path extending in the circumferential direction of the cylindrical member can be even more finely interrupted compared to the case where only one interstitial insulating portion is provided. Consequently, inductance of the cylindrical member can be even more reduced and thus deterioration in communication characteristics of the IC tag is even more minimized.

Desired Advantageous Effects of the Invention

According to the present invention, deterioration in communication characteristics of an IC tag can be decreased or minimized in the cap seal.

DESCRIPTION OF REPRESENTATIVE EMBODIMENTS

Figure 1:
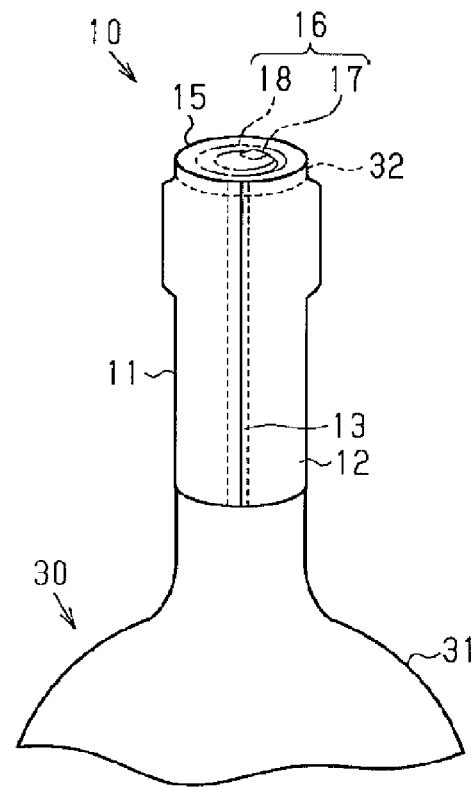
FIG. 1 is a perspective view illustrating a structure of a cap seal together with a container that is an object to which the cap seal is mounted, according to a first embodiment.

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

[First Embodiment]

Figure 2:
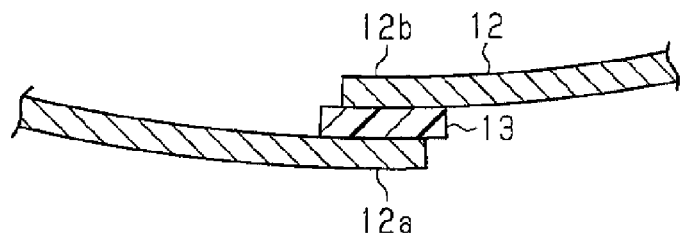
FIG. 2 is a cross-sectional view illustrating a structure of the cap seal, as an example, in the vicinity of an insulating portion, according to the first embodiment.
Figure 3:
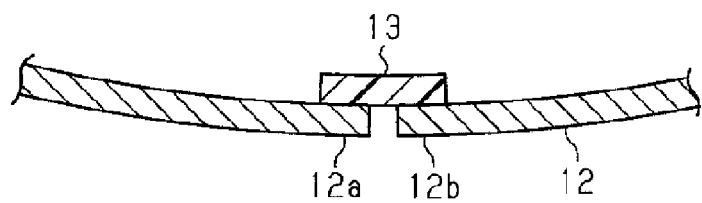
FIG. 3 is a cross-sectional view illustrating a structure of the cap seal, as an example, in the vicinity of an insulating portion, according to the first embodiment.

With reference to FIG. 1 to 3, a first embodiment of a cap seal will be described. It should be noted that cap seals are also referred to as capsules, sheaths, or protective sleeves.

FIG. 1 shows a cap seal mounted to a container. Specifically, FIG. 1 shows a cap seal 10 mounted to a container 30 which is configured by a container body 31 and a sealing member 32. The container body 31 defines a space holding the contents. The sealing member 32 seals an opening of the container body 31. The opening of the container 31 is provided at an end thereof to serve as an inlet or outlet for the contents. The container 30 is, for example, a glass bottle containing wine. The sealing member 32 in this case is a cork stopper. The opening and the sealing member 32 of the container body 31 configure an unsealing part which is unsealed when the contents are taken out.

The cap seal 10 includes a cylindrical member 11 and a top face 15. The cylindrical member 11 is in a cylindrical shape and covers the side face of the neck extending from the opening of the container body 31 and the side face of the sealing member 32. The top face 15 is connected to one of axial ends of the cylindrical member 11 and covers the top of the sealing member 32. In other words, the top face 15 closes one of two axial ends of the cylindrical member 11 and configures the top of the cap seal 10.

The top face 15 is provided with an IC tag 16. The IC tag 16 is used with an RFID (radio frequency identification) system, and includes an IC chip 17 and an antenna 18 for contactless communication. Specifically, the IC tag 16 is configured, for example, by the IC chip 17, the antenna 18, and a base material supporting them. The base material may be formed, for example, of a resin film, paper, synthetic paper, or the like.

The configuration of the IC chip 17 is not particularly limited as long as it includes a contactless communication section that realizes contactless communication. The IC chip 17 may be bare or may be sealed by a sealing member as is used with various IC packages or in chip size packages (CSPs).

The antenna 18 is electrically connected to a terminal of the contactless communication section of the IC chip 17. The antenna 18 is preferably a conductor pattern configured by a thin film made of an electrically conductive material. The thin film made of an electrically conductive material may be a film of aluminum, copper, gold, silver, or the like, or may be a coating film containing a metallic material. The method of forming a pattern of the antenna 18 may be etching, printing, plating, or other methods. The pattern shape of the antenna 18 is determined according to desired frequency characteristics or communication characteristics, such as communication range.

In addition to the IC 16, the top face 15 may include a support layer supporting the IC tag 16, a protective layer covering the IC tag 16, a printed layer configuring characters, a pattern or the like, or other layers. Materials used for these layers of the top face 15 are not particularly limited as long as the layers are made of materials, such as non-metallic materials, that are unlikely to block communication of the IC tag 16. For example, the IC tag 16 is bonded onto a surface of a resin support layer so as to face the inner side of the cap seal 10.

The cylindrical member 11 includes a metal sheet 12 surrounding the container 30, and a band-shaped resin strip 13 extending along the axial direction of the cylindrical member 11. The resin strip 13 configures an adhesive insulating portion that is an example of the insulating portion.

The metal sheet 12 is formed of a sheet of metal extended by rolling or the like, and is disposed on the side face of the neck of the container 30. The metal forming the metal sheet 12 may, for example, be aluminum, tin or the like, although not particularly limited thereto. The metal sheet 12 is a sheet-like member and is wrapped once around the container 30 in the circumferential direction of the cylindrical member 11, starting from and ending at the resin strip 13.

The resin strip 13 is made of a resin that is an insulating adhesive. As such a resin, for example, epoxy resins, silicone resins, or the like may be mentioned. In particular, epoxy resins, which have high insulation properties, are preferably used as a material for the resin strip 13. The resin strip 13 preferably has a resistivity of $10^6$ Ωm or more.

The resin strip 13 linearly extends from an axial end of the cylindrical member 11 to the other axial end thereof. Specifically, the resin strip 13 extends between two axial ends of the cylindrical member 11.

FIG. 2 shows a cross-sectional structure of the cylindrical member 11 in the vicinity of the resin strip 13 taken along the radial direction. As shown in FIG. 2, the metal sheet 12 has two ends 12a and 12b, in the circumferential direction of the cylindrical member 11, both adhered to the resin strip 13. The ends 12a and 12b of the metal sheet 12 are arranged in the radial direction of the cylindrical member 11 with the resin strip 13 being sandwiched therebetween. The ends 12a and 12b are not in direct contact with each other. With the metal sheet 12 being joined to the resin strip 13, the cylindrical portion 11 forms a closed annular shape in the circumferential direction thereof.

As seen from the outside of the cylindrical member 11, the resin strip 13 preferably extends off the end 12a of the metal sheet 12 in the circumferential direction of the cylindrical member 11. Also, as seen from the inside of the cylindrical member 11, the resin strip 13 preferably extends off the end 12b of the metal sheet 12 in the circumferential direction of the cylindrical member 11. With this configuration, both ends of the metal sheet 12 can be reliably prevented from being brought into contact with each other if the cylindrical member 11 is deformed during mounting of the cap seal 10 to the container 30.

With the above configuration, the conductor path residing in the metal sheet 12 and extending in the circumferential direction of the cylindrical member 11 is interrupted by the resin strip 13. In other words, conduction in the circumferential direction of the cylindrical member 11 is interrupted by the resin strip 13. Thus, the inductance of the cylindrical member 11 can be reduced compared to the configuration in which a closed circular conductor path is formed in the cylindrical member 11. In this way, during contactless communication with an external device, the IC tag 16 is less likely to be affected by the influence of electromagnetic fields induced by the cylindrical member 11, and thus communication characteristics, such as communication range of the IC tag 16, are prevented from being deteriorated.

The resin strip 13 sandwiched between the two ends 12a and 12b of the metal sheet 12 preferably has a capacitance that is 3,000 pF or less. For example, assume that, in the resin strip 13, the portion sandwiched between the two ends 12a and 12b has a size of 5 mm×33 mm in plan view, and the resin strip 13 has a relative permittivity of 2.0. In this case, it has been confirmed through experiments that, if the resin strip 13 has a thickness of 1 μm, i.e., if the portion of the resin strip 13 sandwiched between the ends 12a and 12b has a capacitance of 2920.5 pF, good communication can be established at a frequency of 13.56 MHz between the IC tag 16 and an external device to establish communication.

Being induced by the presence of the cylindrical member 11, an impedance intervenes in the communication path between the IC tag 16 and the external device and blocks communication therebetween. The impedance induced by the presence of the cylindrical member 11 is equivalent to a circuit in which a coil based on the metal sheet 12 and a capacitor based on the resin strip 13 are connected in parallel with the IC tag 16 or the external device. It should be noted that the metal sheet 12 has a resistance that is so small that it can be ignored. In general, the impedance of the IC tag 16 is matched to that of the external device, such as a reader/writer, to efficiently transmit signals. Therefore, for the external device, the joint impedance of the IC tag 16 and the cylindrical member 11 is preferably approximate to that of the IC tag 16. Specifically, the parallel LC circuit mentioned above preferably has a small impedance. In other words, in a state where the self-inductance of the above coil is suppressed to a predetermined magnitude, the above capacitor preferably has a small capacitance. The above experiments have shown that, if the communication frequency of 13.56 MHz is used and if the portion of the resin strip 13 sandwiched between the ends 12a and 12b has a capacitance of 3,000 pF or less, the impedance in the parallel LC circuit is sufficiently suppressed and good communication can be established.

The positional relationship between the metal sheet 12 and the resin strip 13 is not limited to one described above, but may be as shown in FIG. 3. Specifically, as shown in FIG. 3, the two ends 12a and 12b of the metal sheet 12 may be arranged on a surface of the resin strip 13 in the circumferential direction of the cylindrical member 11. As long as the ends 12a and 12b are spaced apart from each other in the circumferential direction, the clearance between them may be filled with the resin strip 13, or may be left without being filled. With this configuration, as seen from the outside of the cylindrical member 11, the resin strip 13 is located being sandwiched between the two ends 12a and 12b of the metal sheet 12 in the circumferential direction of the cylindrical member 11. Basically, the metal sheet 12 and the resin strip 13 only have to be joined to each other so that conduction along the circumferential direction of the cylindrical member 11 is interrupted by the resin strip 13.

The connecting portion between the cylindrical member 11 and the top face 15 may have any configuration. For example, an end of the cylindrical member 11 may be bent radially inward, and the top face 15 may be bonded to the bent portion so as to be internal or external to the cylindrical member 11. Alternatively, the rim of the top face 15 may be extended in the axial direction of the cylindrical member 11, and the inner or outer surface of the cylindrical member 11 may be bonded to the extended rim.

The IC tag 16 may have a part that is included in the cylindrical member 11. For example, the IC tag 16 may be provided with a conductor pattern that configures a disconnection detection circuit, and the portion of the IC tag 16 where the disconnection detection circuit is located may be extended to the inner surface of the cylindrical member 11. Disconnection, if any, in the disconnection detection circuit will be detected by the IC chip 17, and the detection results will be used for determining the occurrence of any breakage in the cap seal 10.

For example, the cap seal 10 is mounted to the container 30 as follows. Specifically, a cylindrical member 11 and a top face 15 are joined together to obtain an assembly of a cap seal 10. Then, the unsealing part of the container 30 is inserted into the cylindrical member 11, followed by pressing, such as crimping, to thereby adhere the cap seal 10 to the container 30. Alternatively, assemblage of a cap seal 10 may be performed in parallel with mounting of the cap seal 10 to the container 30. For example, a top face 15 may be joined to a cylindrical member 11 after insertion of the unsealing part into the cylindrical member 11, or the ends 12a and 12b of a metal sheet 12 may be adhered to a resin strip 13 after wrapping the metal sheet 12 around the container 30, for formation of a cylindrical member 11.

As described above, according to the first embodiment, the following advantages can be obtained.

(1) Since the conduction in the circumferential direction of the cylindrical member 11 is interrupted by the insulating portion, deterioration is minimized in communication characteristics, such as communication range of the IC tag 16, compared to the configuration in which a closed circular conductor path is formed in the cylindrical member 11.

(2) The insulating portion can adequately interrupt the conduction mentioned above due to the configuration in which the insulating portion is sandwiched between the ends 12a and 12b of the metal sheet 12 in the radial direction of the cylindrical member 11, or due to the configuration in which, as seen from the outside of the cylindrical member 11, the insulating portion is sandwiched between the ends 12a and 12b of the metal sheet 12 in the circumferential direction of the cylindrical member 11. In particular, in the configuration in which the insulating portion is sandwiched between the ends 12a and 12b of the metal sheet 12 in the radial direction of the cylindrical member 11, the strength of the cylindrical member 11 can be enhanced due to the overlap of the ends of the metal sheet 12. Moreover, if the insulating portion is formed of an adhesive having insulation properties, production of the cylindrical member 11 is facilitated.

(3) Formation of the cylindrical member 11 into a cylindrical shape can simultaneously form the insulating portion in a configuration in which the insulating portion is formed of an adhesive having insulation properties, and a single sheet of the metal sheet 12 is used, with both ends thereof in the circumferential direction of the cylindrical member 11 being adhered to the insulating portion. Thus, the cylindrical member 11 having an insulating portion is realized with a simple configuration, and productivity of the cylindrical member 11 is enhanced.

(Second Embodiment)

Figure 4:
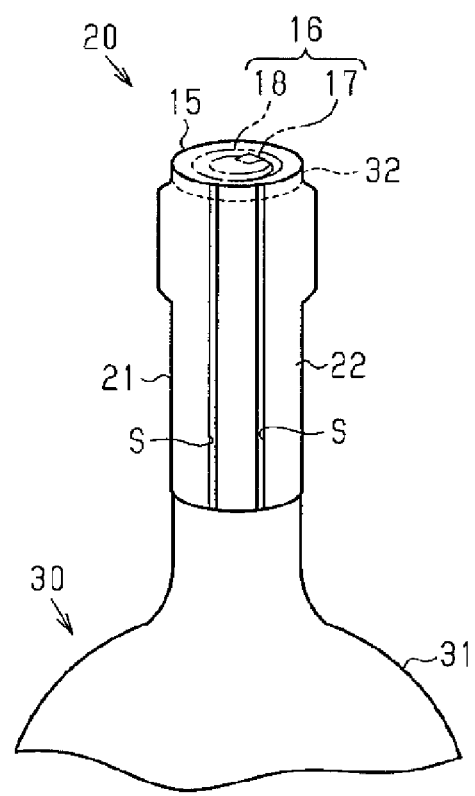
FIG. 4 is a perspective view illustrating a structure of a cap seal together with a container that is an object to which the cap seal is mounted, according to a second embodiment.
Figure 5:
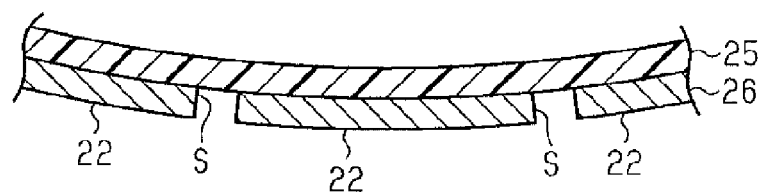
FIG. 5 is a cross-sectional view illustrating a structure of the cap seal in the vicinity of an insulating portion, according to the second embodiment.

Referring to FIGS. 4 and 5, a second embodiment of a cap seal will be described. The following description will be provided focusing on the differences from the first embodiment. The same components as those of the first embodiment are given the same reference signs to omit duplicate description.

FIG. 4 shows a cap seal 20 according to the second embodiment. The cap seal 20 includes a cylindrical member 21 and a top face 15 of which the configuration is the same as that of the first embodiment. As shown in FIGS. 4 and 5, the cylindrical member 21 of the second embodiment is configured by a composite sheet having a multilayer structure of a resin layer 25 and a metal layer 26. The metal layer 26, which is located radially outward in the cylindrical member 21 relative to the resin layer 25, includes a plurality of metal segments 22.

The metal layer 26 is separated by a clearance S or separated by two or more clearances S into a plurality of metal segments 22 in the circumferential direction of the cylindrical member 21. The at least one clearance S extends between two axial ends of the cylindrical member 21. When two or more clearances S are formed, the plurality of metal segments 22 are disposed on the side face of the container 30 to surround the container 30. The at least one clearance S linearly extends from an axial end to the other axial end of the cylindrical member 21.

As shown in FIG. 5, the resin layer 25 and the metal layer 26 are arranged in the radial direction of the cylindrical member 21. Specifically, the metal layer 26 is located radially outward in the cylindrical member 21 relative to the resin layer 25. More specifically, as seen from the outside of the cylindrical member 21, the metal segments 22 of the metal layer 26 are visually observed, and the resin layer 25 is in contact with the side face of the container 30.

The resin configuring the resin layer 25 has insulation properties. Examples of the resin include epoxy resins, silicone resins, polyvinyl chloride resins, and polyethylenes. The resin layer 25 preferably has a resistivity of 106 Ωm or more. Examples of the metal configuring the metal layer 26 include aluminum, tin and copper.

On the resin layer 25, the metal layer 26 is separated by at least one clearance S. The resin layer 25 is one continuous layer without being separated by any clearance.

The resin layer 25 may be provided thereon with two or more clearances S in the circumferential direction of the cylindrical member 21, although the number of which is not particularly limited. If two or more clearances S are formed, each of the plurality of metal segments 22 is sandwiched between two clearances S.

The at least one clearance S is formed by etching a composite sheet, for example, which is a laminate of a resin layer and a metal layer, and removing part of the metal layer. Both circumferential ends of the cylindrical member 21, i.e., both circumferential ends of the composite sheet, may be adhered to each other using an insulating adhesive similarly to the first embodiment, or may be joined to each other using other methods than adhesion using an insulating adhesive.

In the configuration described above, the metal layer 26 is separated by the at least one clearance S, and thus has two adjoining ends with the clearance S located therebetween. If two or more clearances S are provided, of the metal segments 22 adjacent to each other, an end of one metal segment 22 adjoins an end of the other metal segment 22 via a clearance S. Thus, at least a portion of the resin layer 25 is located between two adjoining ends of the metal layer 26 via a clearance S and joins these two ends to each other. In the cap seal 20 of the second embodiment, this portion between the two ends configures an interstitial insulating portion that is an example of the insulating portion. Moreover, with each metal segment 22 being joined to the interstitial insulating portion, a closed annular shape is formed in the circumferential direction of the cylindrical member 21. As seen from the outside of the cylindrical member 21, the interstitial insulating portion is located being sandwiched by the ends of the metal segments 22 arranged in the circumferential direction of the cylindrical member 21.

With the configuration described above, conduction in the circumferential direction of the cylindrical member 21 is interrupted by the interstitial insulating portion. Thus, deterioration in communication characteristics of the IC tag 16 can be minimized compared to the configuration in which a closed circular conductor path is formed in the cylindrical member 21.

In a configuration in which two or more clearances S are provided, the conductor path extending in the circumferential direction of the cylindrical member 21 is more finely interrupted compared to the configuration in which one clearance S is provided. Consequently, the inductance of the cylindrical member 21 can be even more reduced and thus deterioration in communication characteristics of the IC tag 16 can be even more minimized. If patterning is used for the metal layer of the composite sheet, a plurality of clearances S can be easily formed.

As described above, according to the second embodiment, the following advantageous effects can be obtained in addition to the advantageous effects (1) and (2) of the first embodiment.

(4) With the metal layer 26 being separated by at least one clearance S defined on the resin layer 25, there is achieved a configuration in which the conduction in the circumferential direction of the cylindrical member 21 is interrupted by an insulating portion. With this configuration, the position, the size and the shape of the insulating portion can be adjusted by the setting of the position, the size and the shape of the clearance S. Thus, the position, the size and the shape of the insulating portion are easily adjusted and the degree of freedom in adjustment is enhanced.

(5) If two or more clearances S are formed, two or more insulating portions can be provided. With this configuration, the conductor path extending in the circumferential direction of the cylindrical member 21 is even more finely interrupted, and thus deterioration in communication characteristics of the IC tag 16 is even more minimized.

[Modifications]

The embodiments described above can be modified and implemented as follows.

In the first embodiment, the cylindrical member 11 may be provided with a plurality of adhesive insulating portions arranged in the circumferential direction thereof. Specifically, the metal sheet 12 may be separated into a plurality of segments, and in two adjacent segments, an end of one segment and an end of the other segment may be adhered to the resin strip 13. In other words, a plurality of resin strips 13 may be provided, and the segments of the metal sheet 12 and these resin materials 13 may be arranged such that two segments of the metal sheet 12 adjacent to each other in the circumferential direction of the cylindrical member 11 are joined to each other by a resin strip 13. With this configuration, advantageous effects similar to the advantageous effects (5) of the second embodiment can be obtained.

In the second embodiment, the at least one clearance S does not have to be linearly shaped extending in the direction in which the cylindrical member 21 extends, i.e., in the axial direction of the cylindrical member 21, as long as the clearance S extends between the two axial ends of the cylindrical member 21. For example, as seen from the outside of the cylindrical member 21, the at least one clearance S may extend obliquely relative to the direction in which the cylindrical member 21 extends, or may extend in a curved manner, or may draw a pattern.

In each embodiment, the insulating portion does not have to extend between the two axial ends of the cylindrical member, as long as the insulating portion extends from the axial end, as a first end, closed by the top face 15. This configuration may contribute to achieving the effect of minimizing deterioration in communication characteristics of the IC tag 16 compared to the configuration including no insulating portion. In other words, the insulating portion should extend from an axial end, as the first end, of the cylindrical member, but does not have to reach the other axial end.

The material or the shape of the insulating portion may be different from the material or the shape exemplified in the above embodiments, as long as the cylindrical member includes the insulating portion, and the metal portion and the insulating portion are joined to each other forming a closed annular shape in the circumferential direction of the cylindrical member, with conduction in the circumferential direction of the cylindrical member being interrupted.

The contents of the container 30 are not specifically limited. Since the cap seal of each embodiment can eliminate a heating process when mounted to the container 30, the contents are prevented from being deteriorated, which would otherwise be deteriorated by heating. Elimination of a heating process is particularly beneficial to the case where the contents are alcoholic liquors, such as wine.

As long as an opening is provided, the container body 31 is not particularly limited in shape or material thereof. When the container body 31 is made of a brittle material, such as glass, the strength near the opening of the container body 31 tends to be lowered. However, with the cap seal of each embodiment being mounted to the container body, the vicinity of the opening can be protected by the metal portion. In other words, the cap seal exerts an effect of protecting the vicinity of the unsealing part.

The shape or material of the sealing member 32 is not particularly limited as long as it has a structure of closing the opening of the container body 31. The sealing member 32 may be a stopper blocking the opening, or a cap covering the opening.

EXAMPLES

The cap seal will be described by way of specific Examples and Comparative Examples.

Example 1-1

An aluminum sheet was rolled into a cylindrical shape and both circumferential ends thereof were fixed by an insulating tape to form a cylindrical member. In this case, both ends of the aluminum sheet were fixed to the insulating tape such that the insulating tape was sandwiched between both ends of the aluminum sheet in the radial direction of the cylindrical member. In the radial direction of the cylindrical member, the insulating portion configured by the insulating tape had a thickness of 1.0 mm. Resistance of the insulating portion was measured and found to exceed the detection limit of the measuring tool (Milliohm HiTESTER 3540 with a measurement range of 30 KΩ, manufactured by Hioki E.E. Corporation).

An antenna was formed on a circular resin sheet by printing using an electrically conductive ink. Then, an IC chip was mounted to the antenna to form an IC tag. Thus, a circular resin sheet with the IC tag thereon was provided as a top face. The antenna was formed in a circular region having a diameter of 21 mm. The top face was adhered to an axial end of the cylindrical member by using an adhesive to thereby obtain a cap seal of Example 1-1.

Example 1-2

A cap seal of Example 1-2 was obtained through a process similar to that of Example 1-1 except that an insulating portion configured by an insulating tape was formed with a thickness of 2.0 mm. Resistance of the insulating portion was measured and found to exceed the detection limit of the measuring tool (Milliohm HiTESTER 3540 with a measurement range of 30 KΩ, manufactured by Hioki E.E. Corporation).

Example 1-3

A cap seal of Example 1-3 was obtained through a process similar to that of Example 1-1 except that both ends of an aluminum sheet were fixed by an insulating tape such that both ends of the aluminum sheet were arranged in the circumferential direction of the cylindrical member, i.e., the insulating tape was sandwiched between both ends of the aluminum sheet as seen from the outside of the cylindrical member. The insulating tape had a thickness of about 0.1 mm in the radial direction of the cylindrical member. In the circumferential direction of the cylindrical member, the distance between both ends of the aluminum sheet fixed by the insulating portion was 1.0 mm. Resistance of the insulating portion was measured and found to exceed the detection limit of the measuring tool (Milliohm HiTESTER 3540 with a measurement range of 30 KΩ, manufactured by Hioki E.E. Corporation).

Example 1-4

An aluminum sheet was separated into three segments and the segments were arranged in a cylindrical shape. Then, an end of each segment was fixed to an end of the adjacent segment by an insulating tape to form a cylindrical member. In this case, both ends of respective segments of the aluminum sheet and the insulating tape were fixed such that the insulating tape was sandwiched between ends of adjacent segments of the aluminum sheet as seen from the outside of the cylindrical member. Except for this, a cap seal of Example 1-4 was obtained through a process similar to that of Example 1-1. Specifically, the cap seal of Example 1-4 had a configuration in which the number of insulating portions was increased to three compared to the cap seal of Example 1-3. The insulating tape had a thickness of about 0.1 mm in the radial direction of the cylindrical member. In the circumferential direction of the cylindrical member, the distances between the ends of adjacent segments of the aluminum sheet fixed by the three insulating portions were respectively 1.0 mm, 2.0 mm and 5.0 mm. Resistances of the respective insulating portions were measured and found to exceed the detection limit of the measuring tool (Milliohm HiTESTER 3540 with a measurement range of 30 KΩ, manufactured by Hioki E.E. Corporation).

Comparative Example 1

An aluminum sheet was rolled into a cylindrical shape and both circumferential ends thereof were engaged to each other to form a cylindrical member. Except for this, a cap seal of Comparative Example 1 was obtained through a process similar to that of Example 1-1. Specifically, the cap seal of Comparative Example 1 had a cylindrical member configured by only a metal portion without being provided with an insulating portion.

<Examination for Communication Characteristics>

For the cap seals of the examples and the comparative example, communication range was measured to examine communication characteristics. Specifically, each cap seal was fixed to a height gauge with the top face downward, and an IC tag reader was disposed immediately below the top face. Then, each cap seal was moved upward until communication between the IC tag and the reader stopped completely, i.e., until the reader stopped showing that there was a state of communication. The distance between each top face and the reader was measured immediately before communication was lost between the IC tag and the reader. In this way, a communication range was calculated for each of the IC tags of the examples and the comparative example. As Reference Example 1, an IC tag alone was fixed to a height gauge and a communication range was measured in the same manner. Table 1 shows the results of measurements of communication range for the examples, the comparative example, and the reference example.

TABLE 1

| | Example 1-1 | Example 1-2 | Example 1-3 | Example 1-4 | Comparative Example 1 | Reference Example 1 |
|---|---|---|---|---|---|---|
| Communication range (mm) | 17.1 | 20.0 | 18.5 | 23.1 | 15.8 | 25.5 |

As shown in Table 1, communication ranges of all Examples 1-1 to 1-4 were smaller than that of Reference Example 1 but larger than that of Comparative Example 1. Thus, it was confirmed that deterioration in communication characteristics was minimized by providing an insulating portion to the cylindrical member.

Examples 1-1 and 1-2 were compared, in both of which an insulating portion was sandwiched between metal portions in the radial direction of the cylindrical member. As a result, it was confirmed that communication range was increased in the cap seal having an insulating portion of a larger thickness in the radial direction. Comparing Examples 1-3 and 1-4, it was confirmed that communication range was increased in the cap seal having a larger number of insulating portions.

Example 2-1

An aluminum sheet was rolled into a cylindrical shape, and a polyethylene terephthalate (PET) film was sandwiched, in the radial direction, between the circumferential ends of the aluminum sheet to adhere both ends of the aluminum sheet to the PET film, thereby obtaining a cylindrical member. The aluminum sheet had a thickness of 11 μm, and the cylindrical member had a diameter of 30 mm and a height of 65 mm. The PET film had a thickness of 47 μm, a width of 1 mm in the circumferential direction of the cylindrical member, and a length of 65 mm in the axial direction of the cylindrical member. Specifically, the PET film configuring the insulating portion joined the two axial ends of the cylindrical member to each other.

A top face was formed including an IC tag having an antenna that was formed in a 15 mm×15 mm square region. The top face formed in this manner was combined with the cylindrical member to thereby obtain a cap seal of Example 2-1.

Example 2-2

A slit was formed in a cylindrical member of an aluminum sheet in the axial direction from an axial end thereof, and then an insulating tape was applied at the portion where the slit was formed to obtain a cylindrical member. The aluminum sheet had a thickness of 11 μm, and the cylindrical member had a diameter of 30 mm and a height of 65 mm. The slit had a length of 15 mm from the axial end of the cylindrical member.

A top face was formed including an IC tag having an antenna that was formed in a 15 mm×15 mm square region. The top face formed in this manner was disposed so as to close the axial end of the cylindrical member to obtain a cap seal of Example 2-2.

Example 2-3

A cap seal of Example 2-3 was obtained through a process similar to that of Example 2-2 except that a slit was formed with a length of 30 mm from the axial end of the cylindrical member.

Example 2-4

A cap seal of Example 2-4 was obtained through a process similar to that of Example 2-2 except that a slit was formed with a length of 40 mm from the axial end of the cylindrical member.

Example 2-5

A cap seal of Example 2-5 was obtained through a process similar to that of Example 2-2 except that a slit was formed with a length of 65 mm from the axial end of the cylindrical member. In other words, the insulating portion of Example 2-5 extended between two axial ends of the cylindrical member.

Comparative Example 2

A cap seal of Comparative Example 2 was obtained through a process similar to that of Example 2-2 except that no slit was provided. In other words, the cylindrical member of Comparative Example 2 was a metal cylindrical member having no insulating portion.

<Examination for Communication Characteristics>

For the cap seals of the examples and the comparative example, communication range was measured to examine communication characteristics. Specifically, each cap seal was fixed to a height gauge with the top face downward, and an IC tag reader was disposed immediately below the top face. Then, each cap seal was moved upward until communication between the IC tag and the reader stopped completely, i.e., until the reader stopped showing that there was a state of communication. The distance between each top face and the reader was measured immediately before communication was lost between the IC tag and the reader. In this way, a communication range was calculated for each of the IC tags of the examples and the comparative example. As Reference Example 2, an IC tag alone was fixed to a height gauge and a communication range was measured in the same manner. Table 2 shows the results of measurements of communication range for the examples, the comparative example, and the reference example.

TABLE 2

| | Example 2-1 | Example 2-2 | Example 2-3 | Example 2-4 | Example 2-5 | Comparative Example 2 | Reference Example 2 |
|---|---|---|---|---|---|---|---|
| Communication range (mm) | 8.5 | 6.0 | 8.0 | 9.5 | 10.0 | 0 | 14.0 |

As shown in Table 2, communication ranges of all Examples 2-1 to 2-5 were smaller than that of Reference Example 2 but larger than that of Comparative Example 2. Thus, it was confirmed that deterioration in communication characteristics was minimized by providing an insulating portion to the cylindrical member.

Taking Examples 2-2 to 2-5 having insulating portions with different lengths, it was confirmed that communication range was increased compared to Comparative Example 2 even when the insulating portion did not extend between the two axial ends of the cylindrical member, as long as the insulating portion extended from the axial end closed by the top face. Moreover, it was confirmed that as the length of the insulating portion was increased, the communication range was increased accordingly, i.e., deterioration in communication characteristics of the IC tag was minimized accordingly. Change of communication range relative to change of length of an insulating portion became more pronounced as the length of the insulating portion decreased. In this regard, Example 2-4, which had an insulating portion with a length of 40 mm relative to the height of 65 mm of the cylindrical member, could ensure a communication range equal in level to that of Example 2-5 in which an insulating portion was provided throughout the axial length of the cylindrical member. Thus, it was suggested that good communication range could be ensured as long as the insulating portion is configured to have a length of two thirds or more the length of the cylindrical member in the direction in which the cylindrical member extended.

REFERENCE SIGNS LIST

S . . . Clearance; 10, 20 . . . Cap seal; 11, 21 . . . Cylindrical member; 12, 22 . . . Metal sheet, Metal segment; 12a, 12b . . . End; 13 . . . Resin strip; 15 . . . Top face; 16 . . . IC tag; 17 . . . IC chip; 18 . . . Antenna; 25 . . . Resin layer; 26 . . . Metal layer; 30 . . . Container; 31 . . . Container body; 32 . . . Sealing member.

What is claimed is:

1. A cap seal mounted to an unsealing part of a container and to a neck thereof extending from the unsealing part, comprising:
    a cylindrical member covering a side face of the container; and
    a top face including an IC tag and connected to a first end that is one of two axial ends of the cylindrical member to close the cylindrical member at the first end, wherein
    the cylindrical member includes a metal portion disposed on the side face of the container, and at least one insulating portion extending from the first end, the cylindrical member forming a closed annular shape in a circumferential direction of the cylindrical member, and the metal portion and the insulating portion are joined to each other, and wherein the insulating portion has a length that is two thirds or more the length of the cylindrical member in a direction in which the cylindrical member extends.

2. The cap seal of claim 1, wherein
    the metal portion includes two ends arranged in a radial direction of the cylindrical member; and
    at least one of the at least one insulating portion includes a portion sandwiched between the two ends of the metal portion.

3. The cap seal of claim 1, wherein
    the metal portion includes two ends arranged in a circumferential direction of the cylindrical member; and
    at least one of the at least one insulating portion includes a portion located being sandwiched between the two ends of the metal portion, as seen from the outside of the cylindrical member.

4. The cap seal of claim 2, wherein
    the two ends of the metal portion are both ends of a single metal portion in the circumferential direction; and
    the insulating portion having a portion sandwiched between the two ends is an adhesive insulating portion made of an insulating adhesive, with the both ends of the metal portion being adhered thereto.

5. The cap seal of claim 4, wherein
    the adhesive insulating portion includes a portion sandwiched between the two ends arranged in the radial direction of the cylindrical member; and
    the portion sandwiched between the two ends in the adhesive insulating portion has a capacitance of 3,000 pF or less.

6. The cap seal of claim 1, wherein
    the cylindrical member has a multilayer structure including a plurality of layers arranged in a radial direction of the cylindrical member;
    the plurality of layers includes a resin layer and a metal layer, the resin layer having insulating properties, the metal layer being located radially outward of the resin layer to configure the metal portion, the metal layer having two ends adjoining each other on the resin layer via a clearance extending from the first end; and
    the resin layer includes an interstitial insulating portion joined to the two ends of the metal layer to configure the insulating portion.

7. The cap seal of claim 6, wherein the resin layer includes a plurality of interstitial insulating portions.

8. A cap seal mounted to an unsealing part of a container and to a neck thereof extending from the unsealing part, comprising:
    a cylindrical member covering a side face of the container; and
    a top face including an IC tag and connected to a first end that is one of two axial ends of the cylindrical member to close the cylindrical member at the first end, wherein
    the cylindrical member includes a metal portion disposed on the side face of the container, and at least one insulating portion extending from the first end, the cylindrical member forming a closed annular shape in a circumferential direction of the cylindrical member, and the metal portion and the insulating portion are joined to each other and wherein
    the metal portion includes two ends arranged in a radial direction of the cylindrical member; and
    at least one of the at least one insulating portion includes a portion sandwiched between the two ends of the metal portion.

9. The cap seal of claim 8, wherein
    the metal portion includes two ends arranged in a circumferential direction of the cylindrical member; and
    at least one of the at least one insulating portion includes a portion located being sandwiched between the two ends of the metal portion, as seen from the outside of the cylindrical member.

10. The cap seal of claim 8, wherein
    the two ends of the metal portion are both ends of a single metal portion in the circumferential direction; and
    the insulating portion having a portion sandwiched between the two ends is an adhesive insulating portion made of an insulating adhesive, with the both ends of the metal portion being adhered thereto.

11. The cap seal of claim 10, wherein
    the adhesive insulating portion includes a portion sandwiched between the two ends arranged in the radial direction of the cylindrical member; and
    the portion sandwiched between the two ends in the adhesive insulating portion has a capacitance of 3,000 pF or less.

12. The cap seal of claim 8, wherein
    the cylindrical member has a multilayer structure including a plurality of layers arranged in a radial direction of the cylindrical member;
    the plurality of layers includes a resin layer and a metal layer, the resin layer having insulating properties, the metal layer being located radially outward of the resin layer to configure the metal portion, the metal layer having two ends adjoining each other on the resin layer via a clearance extending from the first end; and
    the resin layer includes an interstitial insulating portion joined to the two ends of the metal layer to configure the insulating portion.

13. The cap seal of claim 12, wherein the resin layer includes a plurality of interstitial insulating portions.

14. A cap seal mounted to an unsealing part of a container and to a neck thereof extending from the unsealing part, comprising:
    a cylindrical member covering a side face of the container; and
    a top face including an IC tag and connected to a first end that is one of two axial ends of the cylindrical member to close the cylindrical member at the first end, wherein the cylindrical member includes a metal portion disposed on the side face of the container, and at least one insulating portion extending from the first end, the cylindrical member forming a closed annular shape in a circumferential direction of the cylindrical member, and the metal portion and the insulating portion are joined to each other and wherein the metal portion includes two ends arranged in a circumferential direction of the cylindrical member; and at least one of the at least one insulating portion includes a portion located being sandwiched between the two ends of the metal portion, as seen from the outside of the cylindrical member.

15. The cap seal of claim 14, wherein the cylindrical member has a multilayer structure including a plurality of layers arranged in a radial direction of the cylindrical member;

the plurality of layers includes a resin layer and a metal layer, the resin layer having insulating properties, the metal layer being located radially outward of the resin layer to configure the metal portion, the metal layer having two ends adjoining each other on the resin layer via a clearance extending from the first end; and the resin layer includes an interstitial insulating portion joined to the two ends of the metal layer to configure the insulating portion.

16. The cap seal of claim 15, wherein the resin layer includes a plurality of interstitial insulating portions.

\* \* \* \* \*